(No Model.)
J. SLIMM.
FURNACE.
No. 450,043. Patented Apr. 7, 1891.
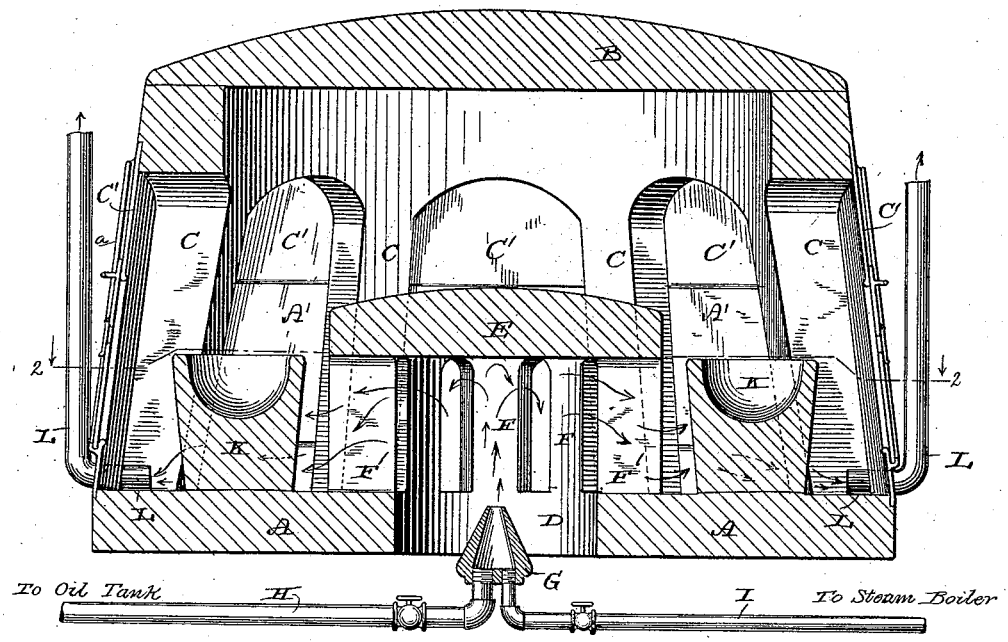
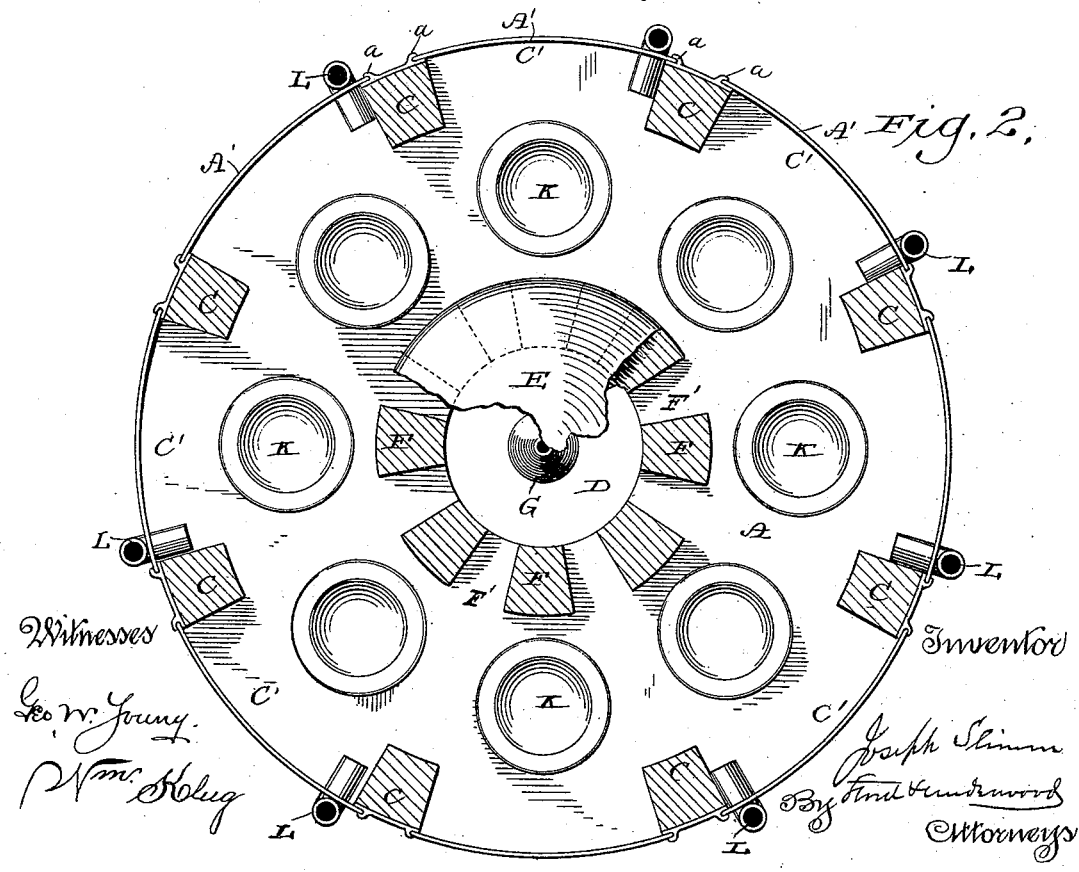
Witnesses
Geo. W. Young.
Wm. Klug.
Inventor
Joseph Slimm
By Fred Underwood
Attorneys

UNITED STATES PATENT OFFICE.

JOSEPH SLIMM, OF MILWAUKEE, WISCONSIN.

FURNACE.

SPECIFICATION forming part of Letters Patent No. 450,043, dated April 7, 1891.

Application filed May 7, 1889. Serial No. 309,947. (No model.)

*To all whom it may concern:*

Be it known that I, JOSEPH SLIMM, of Milwaukee, in the county of Milwaukee, and in the State of Wisconsin, have invented certain new and useful Improvements in Furnaces; and I do hereby declare that the following is a full, clear, and exact description thereof.

My invention relates to glass furnaces, kilns, &c.; and my invention consists in certain peculiar and novel features of construction and arrangement, as hereinafter described and claimed.

In the accompanying drawings, Figure 1 is a central vertical section of a furnace embodying my invention. Fig. 2 is a horizontal cross-section of the same on line 2 2, Fig. 1.

The objects of my invention are to produce a glass furnace, kiln, or similar structure which shall be of the utmost simplicity of construction and which shall develop the maximum effective application of heat while reducing waste and ineffective absorption of heat to the minimum. These results I attain by virtue of the construction which I will now proceed to describe.

In the said drawings, A designates the base of the furnace, which is of brick or masonry work and which is also preferably of circular marginal contour. This base is formed with a central opening D, and upon the upper side of the base immediately surrounding the opening D is a circular or cylindrical wall F, which is provided at intervals with a number of vertically-elongated openings F'. Upon this wall F rests a top piece E, which completely closes the top of the wall and which serves as a deflector, as hereinafter more fully explained. Surrounding and concentric with the inner wall F is an outer wall C, which is shown circular in form, and which at intervals is provided with a number of vertically-elongated openings C', through which ingress to the interior of the furnace is had. The top of this outer wall C is covered by a top piece B, which constitutes the roof or dome of the furnace. Upon the outer surface of the wall C are placed a number of vertical guides $a$, which are arranged in pairs at either side of each opening C', and which receive removable panels A', each of said panels serving when in position to close one of the said openings C'.

G designates a hydrocarbon-burner, which is located within the opening D of the base and which is connected with a suitable oil-reservoir (not shown) by a pipe H, and with a suitable steam-generator (also not shown) by a pipe I.

L designates a number of pipes, the lower ends of which enter the openings C' beneath the panels A', and which extend thence upward to a stack or any point of draft-outlet.

I have shown the furnace as applied to glass-melting, and have also shown a number of crucibles K placed in the circular space between the inner wall F and outer wall C. The heat from the burner enters the opening D, is deflected by the top E, and passes thence through the openings F'. From thence the heat passes obliquely downward and outward to the pipes L, through which it escapes from the furnace. It is to be observed that the waste of heat by absorption into the parts of the furnace is reduced to the lowest possible limit, the absorption being only produced by the deflector E, and is very slight there, owing to the rapid passage of the heat over said deflector. The inner wall F, owing to its open structure, also absorbs but little of the heat, which then passes directly toward the pipes L the effective absorption occurring before the heat reaches said pipes. It is also to be observed that the heat flows laterally and downward past the crucibles, and thus comes into contact with a very extensive portion of the area of the crucibles and their contents, whereby the maximum degree of effective application of heat is attained.

While I have shown the furnace and its inner and outer walls and its deflector and dome as of circular form, I do not wish to be understood as confining myself to this precise form, as such parts may be square, angular, oval, or oblong, as preferred, provided always that they preserve the open character and the relative positions described.

It is obvious that the furnace can be used as a kiln, in which case the bricks, pottery, or other articles to be fired will be placed in the space between the inner and outer walls F C. The furnace may also be used as a steam-generating furnace by placing a boiler in the space above the deflector E, in which latter event all possibility of burning out the boiler is prevented by said deflector. It is to be observed, also, that this furnace possesses no tortuous passages, which produce great waste of heat by absorption.

Having thus described my invention, what I claim as new therein, and desire to secure by Letters Patent, is—

1. An improved furnace comprising a base having a heat-inlet opening, a vertical inner skeleton wall rising above and surrounding said opening, a deflector resting upon said inner wall, an outer wall concentric with the inner wall and having a number of ingress-openings, removable panels closing said openings, outlet-pipes communicating with the bottoms of said ingress-openings, and a dome or top resting on the outer wall and covering the furnace, substantially as set forth.

2. An improved furnace comprising a base having a heat-inlet opening, a heat-generator located in said opening, a vertical skeleton wall located above and surrounding said opening, a deflector resting upon said inner wall, an outer wall concentric with the inner wall and having a number of ingress-openings, removable panels closing said openings, a dome resting upon the outer wall and covering the furnace, and a number of outlet-pipes communicating with the bottoms of the outer-wall-openings, substantially as set forth.

In testimony that I claim the foregoing I have hereunto set my hand, at Milwaukee, in the county of Milwaukee and State of Wisconsin, in the presence of two witnesses.

JOSEPH SLIMM.

Witnesses:
S. S. STOUT,
WILLIAM KLUG.